US007702836B2

(12) United States Patent
Todoroki et al.

(10) Patent No.: US 7,702,836 B2
(45) Date of Patent: Apr. 20, 2010

(54) PARALLEL PROCESSING DEVICE AND EXCLUSIVE CONTROL METHOD

(75) Inventors: Akinari Todoroki, Okaya (JP); Akihiko Tamura, Matsumoto (JP); Katsuya Tanaka, Sapporo (JP); Hiroaki Takada, Nagoya (JP); Shinya Honda, Aichi (JP)

(73) Assignees: Seiko Epson Corporation, Tokyo (JP); National University Corporation Nagoya University, Nagoya-shi (JP)

( * ) Notice: Subject to any disclaimer, the term of this patent is extended or adjusted under 35 U.S.C. 154(b) by 0 days.

(21) Appl. No.: 11/886,326

(22) PCT Filed: Feb. 16, 2007

(86) PCT No.: PCT/JP2007/052863

§ 371 (c)(1),
(2), (4) Date: Apr. 9, 2008

(87) PCT Pub. No.: WO2007/094460

PCT Pub. Date: Aug. 23, 2007

(65) Prior Publication Data

US 2008/0288693 A1    Nov. 20, 2008

(30) Foreign Application Priority Data

Feb. 16, 2006    (JP)    ............... 2006-039093

(51) Int. Cl.
*G06F 13/24* (2006.01)
(52) U.S. Cl. ...................................... 710/262; 710/269
(58) Field of Classification Search ......... 710/260–266, 710/269, 200, 220, 240; 709/248
See application file for complete search history.

(56) References Cited

U.S. PATENT DOCUMENTS 5,161,227 A * 11/1992 Dias et al. .................... 718/104

(Continued)

FOREIGN PATENT DOCUMENTS

JP    A 04-343159    11/1992

(Continued)

OTHER PUBLICATIONS

Takada et al., "Real-Time Operating System for Function Distributed Multiprocessors", *Information Processing Society of Japan Magazine*, vol. 47, No. 1, pp. 41-47, Jan. 15, 2006.

(Continued)

*Primary Examiner*—Khanh Dang
(74) *Attorney, Agent, or Firm*—Oliff & Berridge, PLC

(57) ABSTRACT

To provide a processor capable of achieving high processing efficiency by performing the exclusive control between task processing and interrupt handling properly even in a multiprocessor. An interrupt processor that includes a plurality of unit processors, in which at least of the plurality of unit processors is capable of performing interrupt handling requested from the outside is configured such that the unit processor P1 of the unit processors P0 to P3 comprises an purge inhibit flag 106 for causing the unit processor P1 to enter a lock state where the purge of the task is being inhibited, a hardware semaphore unit 13 for inhibiting other unit processors from accessing a predetermined region in memory accessed by the unit processor P1 after the unit processor P1 is brought into the lock state, and an interrupt control unit 11 for inhibiting the interrupt processor from performing the interrupt handling during the execution of exclusive control.

6 Claims, 9 Drawing Sheets

U.S. PATENT DOCUMENTS

| | | | | |
|---|---|---|---|---|
| 5,502,840 | A * | 3/1996 | Barton | 710/200 |
| 5,933,624 | A * | 8/1999 | Balmer | 713/375 |
| 6,148,361 | A * | 11/2000 | Carpenter et al. | 710/260 |
| 6,430,643 | B1 * | 8/2002 | Arndt | 710/263 |
| 6,775,730 | B2 * | 8/2004 | Marr et al. | 710/266 |
| 7,117,285 | B2 * | 10/2006 | Ota | 710/265 |
| 7,350,006 | B2 * | 3/2008 | Yasue et al. | 710/264 |

FOREIGN PATENT DOCUMENTS

JP    A 08-297581    11/1996

OTHER PUBLICATIONS

Yamaha et al., "Analysis of Linux Kernel 2.6", *UNIX User*, vol. 13, No. 10, pp. 123-124, Oct. 1, 2004.

Bovet et al., "Sync process of kernel, Chapter 5", *Understanding Linux Kernel $2^{nd}$ Edition*, pp. 200-203, Jun. 24, 2003.

Dec. 28, 2009 Search Report issued in EP 07 71 4393.

Takada, Hiroaki, et al., "Predictable Spin Lock Algorithms with Preemption," Real-Time Operating Systems and Software, 1994. RTOSS '94, Proceedings $11^{th}$ IEEE Workshop on Seattle, WA, USA May 18-19, 1994, Los Alamitos, CA, USA, IEEE Computer Soc., May 18, 1994, pp. 2-6.

Dharmasanam, S., "Multiprocessing with real-time operating systems," May 21, 2003, pp. 1-7.

Corbet, J., et al., Linux Device Drivers, Third Edition, "Concurrency and Race Conditions," chapter 5, 7955, pp. 106-134, Jan. 21, 2005.

Corbet, J., et al., Linux Device Drivers, Third Edition, "Interrupt Handling," chapter 10, 10847, pp. 258-287, Jan. 21, 2005.

* cited by examiner

US 7,702,836 B2

PARALLEL PROCESSING DEVICE AND EXCLUSIVE CONTROL METHOD

TECHNICAL FIELD

The present invention relates to a processor and, more particularly, to a processor that includes a plurality of unit processors so that tasks can be executed in parallel, and accepts and handles interrupt requests, and an interrupt control method of the processor.

BACKGROUND ART

In recent years, processors called multitask processors (hereinafter collectively referred to as "multiprocessor"), which can handle a plurality of tasks in parallel, are going into use in embedded devices or the like.

In conventional portable devices, processing has been performed with a single processor. However, as the functionality of the portable devices is enhanced, processing is becoming more complicated, and processing with a single processor is becoming difficult.

More specifically, if an attempt is made to achieve high-functionality using a single processor, the single processor has to be run at high clock frequencies, and power consumption increases accordingly. In addition, it would be difficult to deal with a case where a phone must be answered in real time, for example, in such a case where an incoming call is received while moving images are being played in a mobile telephone.

On the other hand, the use of a multiprocessor allows the clock frequency of the device to be lowered, thereby reducing power consumption. Additionally, since a plurality of tasks can be handled in parallel, the use of the multiprocessor is also useful from the viewpoint of real time response.

Incidentally, in some processors for such embedded devices, requests for interrupt handling are relatively frequently made from peripheral devices connected to the embedded device. When an interrupt request is made, interrupt handling is performed: task processing that is being performed by the processor is suspended, and the requested processing is performed. In the interrupt handling, exclusive control is implemented between the task processing and the interrupt handling in order to smoothly switch between the interrupt handling and the task processing.

One example of the prior art of conventional exclusive control between task processing and interrupt handling is Patent Document 1. The invention described in Patent Document 1 is related to exclusive control in a single processor, wherein interrupt handling that does not issue any system call is accepted even during processing in which system calls for calling an OS are issued in the single processor. The invention of Patent Document 1 uses such behavior to reduce wait time of highly urgent interrupt handling.

[Patent Document 1] JP-A-8-297581

DISCLOSURE OF THE INVENTION

However, the above-described prior art is not for multiprocessors, but for single processors. If such an invention described in Patent Document 1 is applied to a multiprocessor, possibility cannot be eliminated that one unit processor contained in the multiprocessor accesses the same region in external memory as that for the interrupt handling in another unit processor.

In addition, since the invention described in Patent Document 1 is based on the premise that a single processor is used, task processing cannot be performed during interrupt handling. Consequently, it has not been considered at all that while the interrupt handling is being performed, task processing is to be controlled to increase processing efficiency.

Additionally, in the invention described in Patent Document 1, information indicating whether the interrupt handling may issue a service call or not must be stored in managed interrupt storage means. In such Patent Document 1, when a new peripheral device is connected to the processor, information indicating whether the interrupt handling requested from the peripheral device involves a service call or not must be stored. Consequently, a problem arises that the addition of peripheral devices is difficult.

The present invention is made in the light of the above respects, and an object of the present invention is to provide a processor that can perform exclusive control between task processing and interrupt handling properly even with a multiprocessor to achieve high processing efficiency, and an exclusive control method between the task processing and the interrupt handling in the processor.

To solve the above-described problems, the parallel processing device of the present invention that includes a plurality of unit processors for executing a plurality of tasks in parallel, and achieves exclusive control between one task and another task, and between the task and external interrupt handling when at least one of the plurality of the unit processors receives a request for interrupt handling from the outside, is characterized by comprising, interrupt inhibit means for inhibiting the execution of the task from being interrupted in the unit processor on which the task is executing, exclusive control means for performing the exclusive control between the unit processor and the other unit processors by acquiring an inter-unit processor lock after the interrupt inhibit means creates a unit processor interrupt inhibit state, and external interrupt inhibit means for inhibiting the performance of interrupt handling requested from the outside after the exclusive control means performs the exclusive control between the unit processor and the other unit processors.

According to such an invention, it is possible to inhibit a first unit processor and the other unit processors from accessing a common region in memory after a task is inhibited from being purged from the first unit processor, and is fixed to the unit processor. Consequently, the first unit processor can certainly handle the task without being affected by another task or the like. In addition, since the interrupt handling by an interrupt processor is inhibited from being performed while the exclusive control is being performed, it is possible to eliminate the probability that the interrupt handling, which occurs independently of an OS, accesses the region in the memory in common with the first unit processor, and therefore the exclusive control of tasks can be performed properly to achieve high processing efficiency.

Additionally, the parallel processing device of the present invention is characterized by further comprising interrupt detection means for detecting whether interrupt handling is being performed or not in the parallel processing device, wherein the exclusive control means starts exclusive control after the interrupt detection means detects that the interrupt handling is not being performed in the parallel processing device.

According to such an invention, it is possible to eliminate obstruction to exclusive control in a unit processor due to interrupt handling being inserted after a lock state is entered, and before the exclusive control is started.

In addition, the parallel processing device of the present invention is characterized in that the exclusive control means performs the exclusive control of the other unit processors by acquiring a right to occupy an OS to handle the tasks.

According to such an invention, any of the tasks on the other unit processors cannot become the OS, thus it is possible to eliminate the occurrence of access conflict in the memory region accessed by the OS. Consequently, it is possible to perform the exclusive control of the OS to run smoothly.

Additionally, the exclusive control method of the present invention that includes a plurality of unit processors for executing a plurality of tasks in parallel, and achieves exclusive control between one task and another task, and between the task and external interrupt handling when at least one of the plurality of the unit processors receives a request for interrupt handling from the outside, is characterized by comprising, an interrupt inhibit step for inhibiting the execution of the task from being interrupted in the unit processor on which the task is executing, an exclusive control step for performing the exclusive control between the unit processor and the other unit processors by acquiring an inter-unit processor lock after the interrupt inhibit step causes a unit processor interrupt inhibit state, and an external interrupt inhibit step for inhibiting the performance of interrupt handling requested from the outside after the exclusive control step performs the exclusive control between the unit processor and the other unit processors.

According to such an invention, it is possible to inhibit a first unit processor and the other unit processors from accessing a common region in memory after a task is inhibited from being purged from the first unit processor, and is fixed to the unit processor. Consequently, the first unit processor can certainly handle the task without being affected by another task or the like. In addition, since the interrupt handling by an interrupt processor is inhibited from being performed while the exclusive control is being performed, it is possible to eliminate the probability that the interrupt handling, which occurs independently of an OS, accesses the region in the memory in common with the first unit processor, and therefore the exclusive control of tasks can be performed properly to achieve high processing efficiency.

Additionally, the exclusive control method of the present invention is characterized by comprising a step of waiting for the completion of the performance of the interrupt handling requested from the outside.

According to such an invention, it is possible to eliminate obstruction to exclusive control in a unit processor due to external interrupt handling being inserted after a lock state is entered, and before the exclusive control is started.

Furthermore, the exclusive control method of the present invention that achieves exclusive control between task processing and external interrupt handling in a processor that includes a plurality of unit processors running in parallel, in which at least one of the plurality of unit processors is capable of performing interrupt handling requested from the outside, is characterized by comprising an external interrupt priority step for prioritizing the external interrupt handling by issuing a system call (loc_cpu) for exclusion only on the task side to wait for the completion of the interruption in the system call.

According to such an invention, it is possible to prevent the task processing and the external interrupt handling from interfering with each other, and achieve stable operation of the OS in the parallel processing device that uses already-developed task processing software together with already-developed external interrupt handling software.

BEST MODE FOR CARRYING OUT THE INVENTION

In the following, embodiments of a parallel processing device and an exclusive control method according to the present invention will be described with reference to drawings. Incidentally, as a parallel processing device is configured as a processor in the specification, a parallel processing device according to the present invention is hereinafter referred to as a processor.

The processor according to the present invention processes programs in its run units, such as tasks, in parallel and has hardware configuration having substantially more than one processor therein, each of which executes tasks (hereinafter, referred to as "unit processor").

In the embodiment, the processor of the present invention will be described by taking a case as an example where the processor according to the present invention is embedded into a mobile telephone. Incidentally, in the following description, the run unit of the program such as a thread is collectively called "task".

Figure 1:
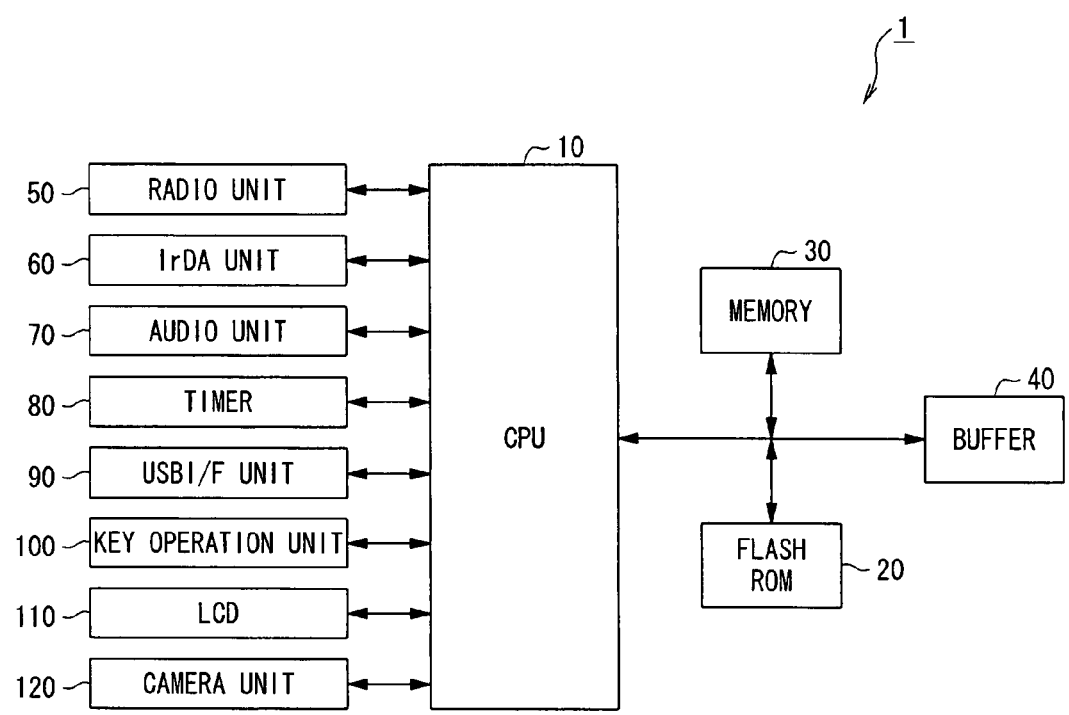
FIG. 1 is a block diagram showing the functional configuration of a mobile telephone 1 according to the present invention.

FIG. 1 is a block diagram showing the functional configuration of a mobile telephone 1 according to the present invention.

In FIG. 1, the mobile telephone 1 includes a central processing unit (CPU) 10, a flash ROM 20, memory 30, a buffer 40, a radio unit 50, an infrared data association (IrDA) unit 60, an audio unit 70, a timer 80, an universal serial bus (USB) interface unit 90, a key operation unit 100, an liquid crystal display (LCD) 110 and a camera unit 120, and the CPU 10, the flash ROM 20, the memory 30 and the buffer 40 are connected by a bus. The radio unit 50, the IrDA unit 60, the audio unit 70, the timer 80, the USB interface unit 90, the key operation unit 100, the LCD 110 and the camera unit 120 are directly connected to the CPU 10.

The CPU 10 controls the entire mobile telephone 1 while handling a plurality of tasks in parallel: it reads out and executes operating system programs (OS) and various application programs that were stored in the flash ROM 30 in accordance with various instruction signals, which are entered from the key operation unit 100, or executes interrupt handlers in accordance with interrupt signals, which are entered from peripheral chips such as the radio unit 50, the audio unit 70 or the camera unit 120.

For example, the CPU 10 handles tasks in parallel, which are generated by an application. In addition, when an interrupt signal is entered from a peripheral chip, the CPU 10 executes an interrupt handler to execute a program corresponding to the interruption. Incidentally, since processing by an application is performed as a task that is managed by the task scheduler of the OS, it is possible to invoke an OS service call, while interrupt handling is processing that is not managed by the task scheduler (non-task processing).

The CPU 10 also stores various processing results in the flash ROM 20 or the memory 30.

Figure 2:
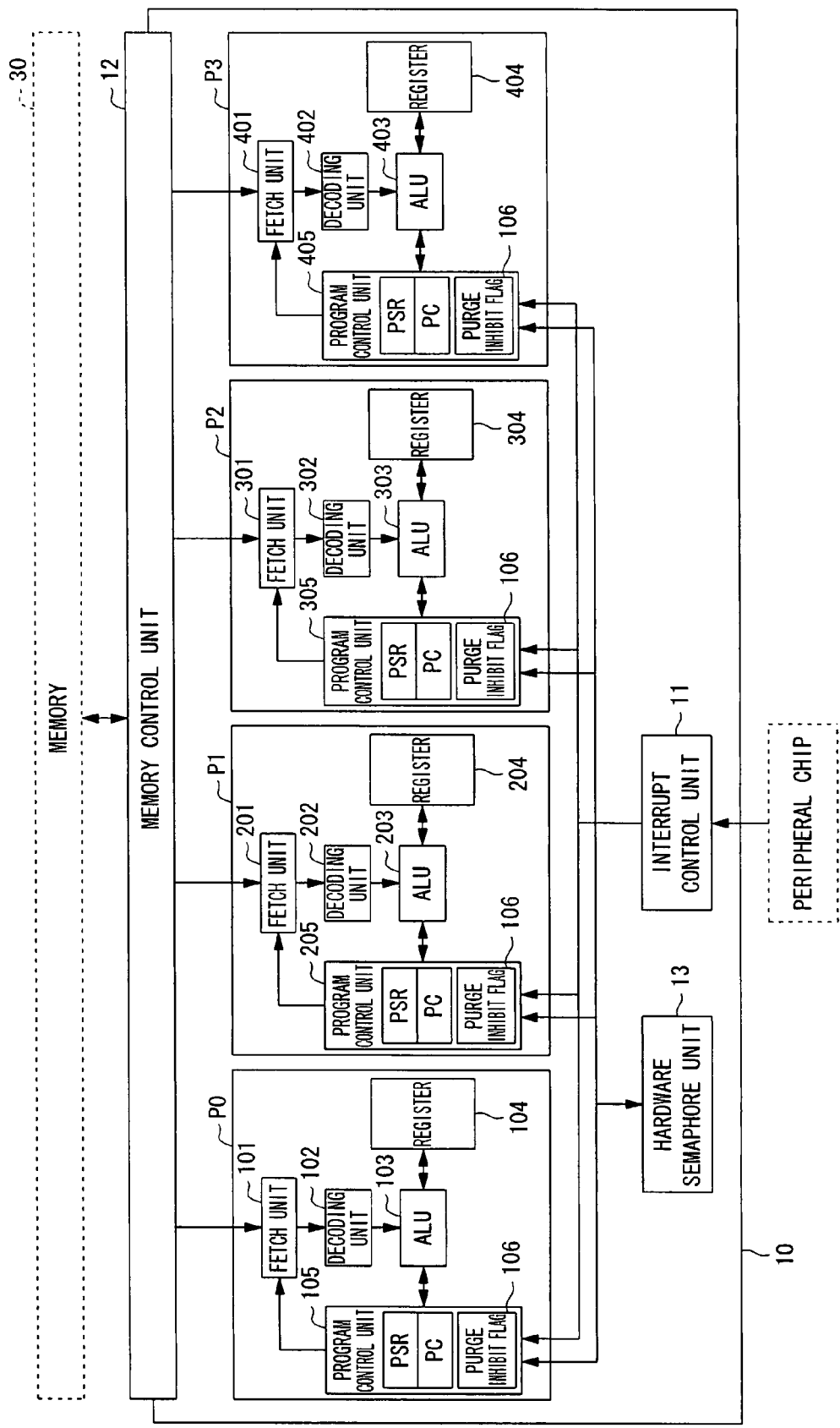
FIG. 2 is a block diagram showing the internal configuration of a CPU 10.

FIG. 2 is a block diagram showing the internal configuration of the CPU 10. In FIG. 2, the CPU 10 includes a plurality of unit processors P0 to P3, an interrupt control unit 11, a memory control unit 12 and a hardware semaphore unit 13. Incidentally, the hardware semaphore unit 13 is adapted to grant a semaphore (in the embodiment, referred to as hardware semaphore), which is a right to become an OS, to any of the unit processors.

The unit processors P0 to P3 are processors, each of which is capable of handling tasks in parallel. Since the unit processors P0 to P3 have the same internal configuration, the internal configuration of the unit processor P0 will be described as a representative thereof. In the embodiment, all the unit processors P0 to P3 are interrupt processors capable of interrupt handling.

The unit processor P0 further includes a fetch unit 101, a decoding unit 102, an arithmetic and logical unit (ALU) 103, a register file 104 and a program control unit 105.

The fetch unit 101 reads out an instruction code from a memory address indicated by the program counter of the program control unit 105 described later, and outputs the instruction code to the decoding unit 102.

The decoding unit 102 decodes the instruction code that was entered by the fetch unit 101, and outputs a decoding result (such as the contents of the instruction and the addresses of source and destination registers) to the ALU 103.

The ALU 103 carries out a predetermined operation according to the decoding result that was entered by the decoding unit 102, and writes an operation result into the register file 104, or outputs the address of a destination branch, which is the operation result of a branch instruction or the like, to the program control unit 105.

The register file 104 is a group of registers, which store data that are read out by load instructions from the memory 30 and data that are operation results of the ALU 103.

The program control unit 105 that controls the entire unit processor P0 includes a status register (PSR) for storing the status of the unit processor P0 (for example, a state indicating whether or not interrupt is enabled, and an overflow occurrence state in the unit processor P0) and a program counter (PC) for storing a memory address in which an instruction to be executed next by the unit processor P0 is stored. The program control unit 105 changes the value of the status register to a state in which interrupt handling is inhibited at the time when the unit processor P0 shifts to the interrupt handling, or changes the value of the program counter to the address of the destination branch when the branch instruction was executed.

In addition, when a running task outputs a request to acquire a hardware semaphore, the processor control unit 105 first receives the acquisition result of the hardware semaphore, and updates a flag indicating the success of the acquisition in a region in the status register (hereinafter, referred to as "semaphore acquisition result register") where the acquisition result of the hardware semaphore is indicated. On the other hand, if the acquisition of the semaphore is failed, the processor control unit 105 updates the flag to a state indicating of the failure of the acquisition.

The processor control unit 105 also has a purge inhibit flag 106. The purge inhibit flag 106 is a mechanism to inhibit replacement of tasks or external interruption from occurring in the appointed unit processor, so as not to purge the task from the unit processor. By setting the purge inhibit flag 106 to 1, the task currently present in the unit processor is inhibited from being replaced by another task. A state that the purge of the task in the unit processor is being inhibited is also referred to as a lock state hereinafter.

When an interrupt signal was entered from a peripheral chip such as the radio unit 50, the interrupt control unit 11 outputs a predetermined interrupt signal to the unit processor P0 after conducting arbitration for the interrupt signal.

The memory control unit 12, which is provided between the CPU 10 and the memory 30, controls the memory 30 to input/output data when the CPU 10 reads/writes data from/to the memory 30.

The hardware semaphore unit 13 has a mechanism to achieve exclusive control, and, when a semaphore acquisition request is received from the unit processors P0 to P3, and if the semaphore has already been acquired, the hardware semaphore unit notifies of the failure of the semaphore acquisition in response to the new request. On the other hand, the hardware semaphore unit 13 has a mechanism to return the notification of the success of the semaphore acquisition to the unit processors, if a semaphore has not been acquired yet.

More specifically, according to the embodiment, only the unit processor that acquires a hardware semaphore acquires a right to occupy the OS to handle the task. Consequently, since only one of the unit processors P0 to P3 can shift to the OS, it is possible to achieve exclusive control to prevent conflict among OSes. In addition, it is possible to prevent a problem that processing is interrupted due to concurrent access to a predetermined region in the memory 30 used by the OS.

Additionally, according to the embodiment, the purge inhibit flag 106 can inhibit the task from being purged from the running unit processor until the service call of the OS is completed.

Further, according to the embodiment, during the execution of exclusive control, interrupt handling is inhibited from being executed. In the embodiment, it is the interrupt control unit 11 that inhibits the execution of interrupt handling. In other words, the interrupt control unit 11 has a status register (not shown) into which the statuses of the unit processors P0 to P3 are written. By setting the status of the status register to "interrupt inhibited", the interrupt control unit 11 can inhibit the interrupt handling of a desired unit processor.

Next, the above-described operation will be described.

Figure 3:
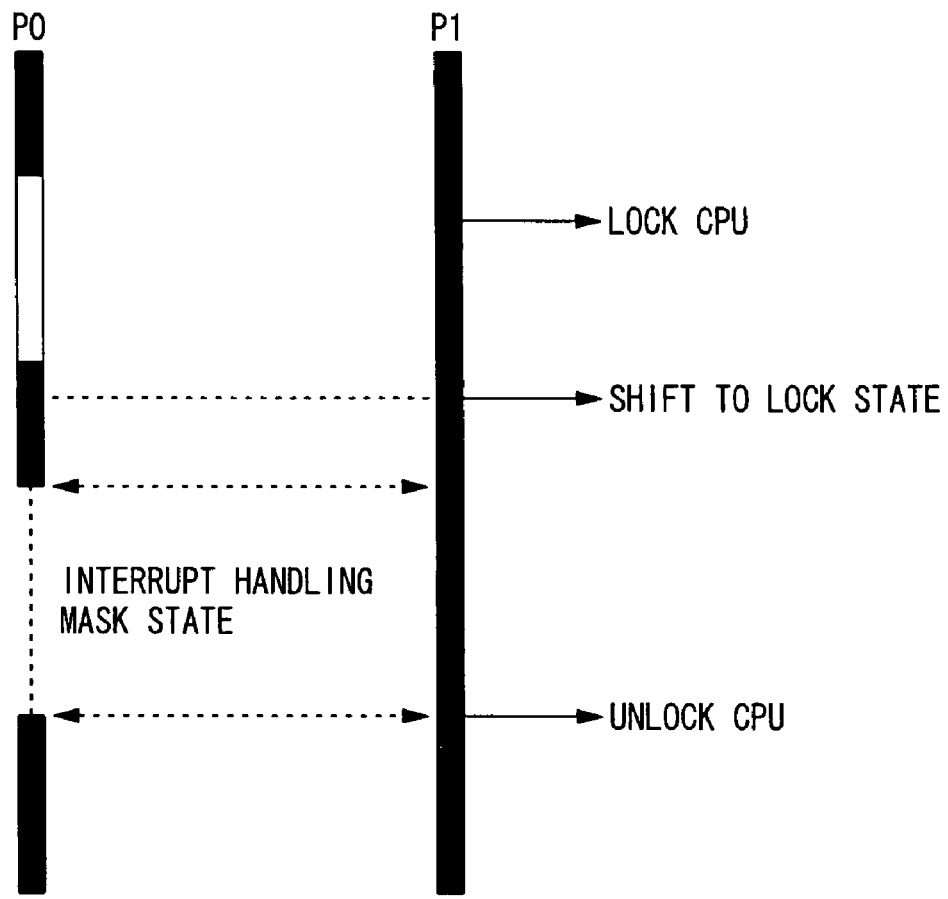
FIG. 3 is a diagram illustrating the operation of the CPU 10 in the mobile telephone 1.

FIG. 3 is a diagram illustrating the operation of a processor when the exclusive control method of the embodiment is performed, and shows exclusive control between interrupt handling (interrupt handler) and task processing that are performed between the unit processor P0 and the unit processor P1. In the illustrated example, a task that is executed on the unit processor P1 first invokes a service call loc_cpu. The invocation of the service call loc_cpu activates the loc_cpu. Incidentally, a service call unl_cpu is a service call for a task to bring the unit processor P1 into a lock state. The service call unl_cpu described later is a service call for releasing the lock state. Such service calls are defined according to ITRON 4.0™ Service Call Specification.

Until the execution of the unl_cpu, the loc_cpu can have the unit processor operated, which handles the task that invoked the service call loc_cpu while keeping a external interrupt inhibit state, a hardware semaphore acquisition state and a purge inhibit state. However, even after the loc_cpu is issued, in order to release the loc_cpu, the only service call of the unl_cpu is accepted at the unit processor P1.

Incidentally, whether interrupt handling is being performed or not in the unit processor is written into RAM or the like inside the device that the unit processors can share, and can be detected by the unit processors referring to the information written into the RAM. In the embodiment, since it is assumed that the interrupt processor is variable, the task of the unit processor P1 inhibits interruption to start exclusive control after it is detected that interrupt handling is not being executed in any of unit processors.

According to such the embodiment, it is possible to prevent a deadlock from occurring at the unit processor P1 due to the occurrence of interrupt handling, which attempts to acquire a hardware semaphore, after the loc_cpu is activated, and before a hardware semaphore is acquired (nanoseconds).

In the following, the exclusive control method performed by the processor of the embodiment will be described more specifically.

Figure 4:
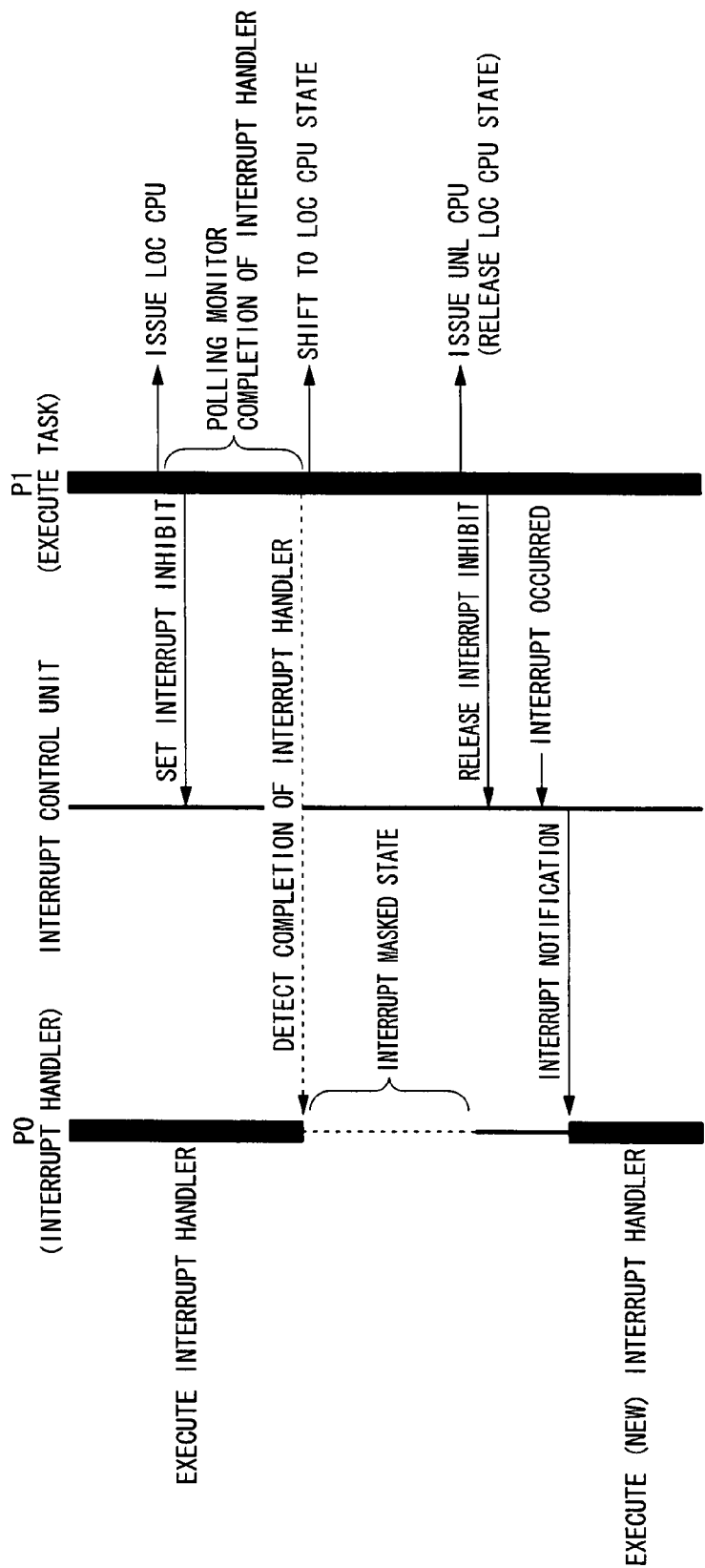
FIG. 4 is a diagram illustrating an exclusive control method according to an embodiment of the present invention, and more specifically showing the operation shown in FIG. 3.
Figure 5:
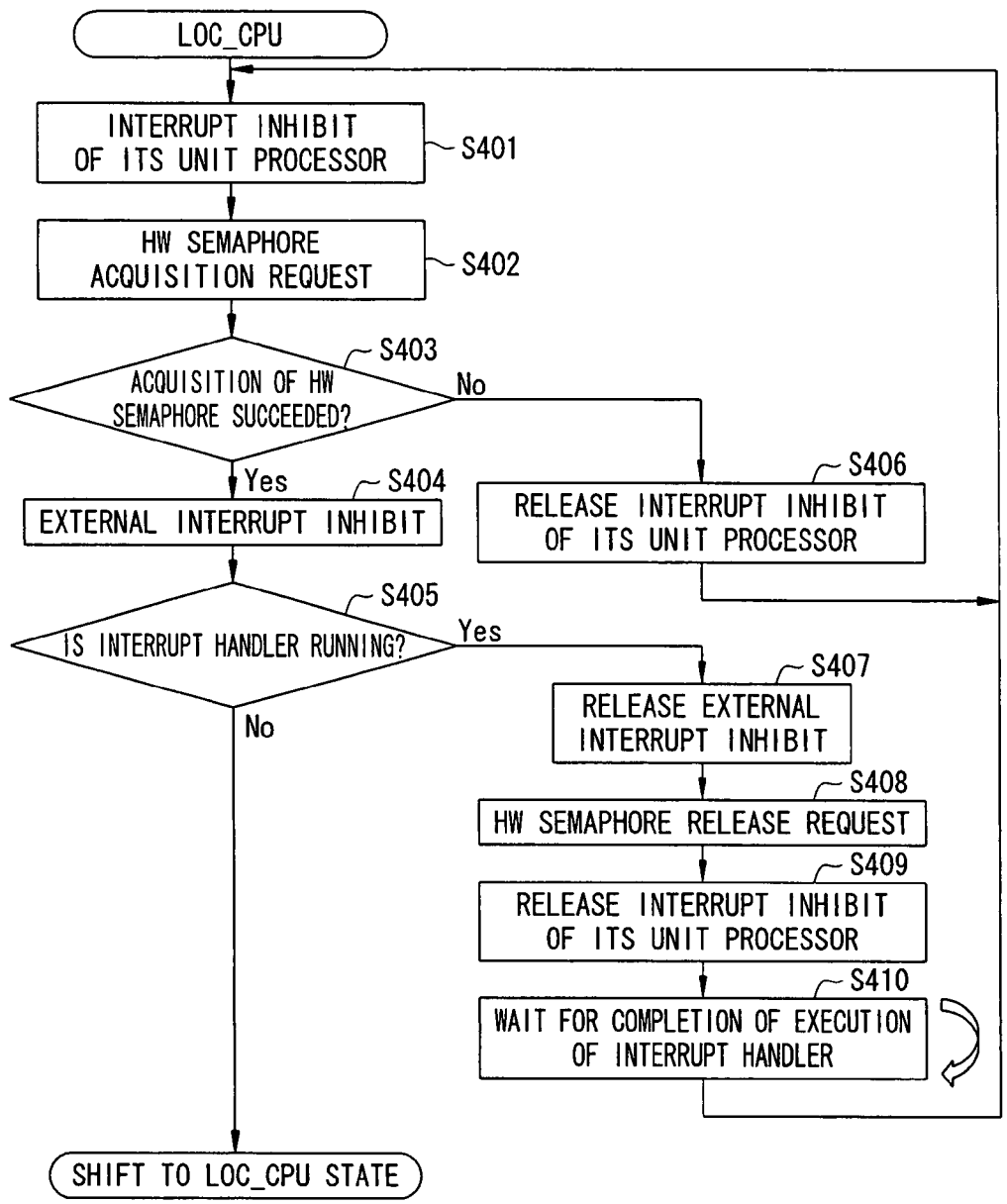
FIG. 5 is a flowchart of the operation of the CPU 10 in the mobile telephone 1 shown in FIG. 4.

FIG. 4 is a diagram more specifically showing the operation shown in FIG. 3. FIG. 5 is a flowchart of the operation shown in FIG. 4. In the following, with reference to FIG. 4, the flowchart shown in FIG. 5 will be described.

As shown in FIG. 4, the task present in the unit processor P1 sets the purge inhibit flag 106 to 1. By setting the purge inhibit flag, the task is not purged from the unit processor P1. In addition, temporarily, interrupt inhibit is set in regard to the unit processor P1 (S401).

Next, the task present in the unit processor P1 requests to acquire a hardware semaphore (S402). The task determines whether the acquisition of the hardware semaphore succeeded or failed based on the notification from the hardware semaphore unit 13 (S403). As a result of the determination, when the acquisition of the hardware semaphore failed (S403: No), the task sets the purge inhibit flag 106 to zero to release the interrupt inhibit of its unit processor (S406). Then, the task begins with the processing for setting the purge inhibit flag 106 to 1 again to attempt to acquire a hardware semaphore.

When the acquisition of the hardware semaphore succeeded (S403: Yes), the task detects whether any interrupt handling is being performed or not by the OS in any other unit processors than the unit processor P1 by referring to the shared region of RAM (S405). As a result, if an interrupt handler is running on any of the unit processors (S405: Yes), the task releases the external interrupt inhibit (S407). In addition, the task requests to release the acquired hardware semaphore unit 13 (S408), and sets the purge inhibit flag 106 to zero to release the interrupt inhibit of its unit processor (S409).

The OS continues to monitor the interrupt handling in the other unit processors, and waits for completion of all the interrupt handling (S410). Upon the completion of the interrupt handling, the OS sets the purge inhibit flag 106 to 1 again to acquire a hardware semaphore.

Additionally, in the above operation, the service call loc_cpu of the task is also used for processing for prioritizing external interruption. In other words, in the embodiment, the task running on the unit processor P1, for example, issues a system call (loc_cpu) to wait for the completion of interruption in the system call, thereby prioritizing the external interrupt handling.

More specifically, as shown in FIG. 4, the task issues loc_cpu to wait for the completion of the interrupt handler, which is executing on the unit processor P0, while polling monitoring the completion of the interrupt handler. Consequently, after the preceding interrupt handler that was running is completed, the interrupt handling on the unit processor P0 is brought into a masked state such that the interrupt handling can be performed in preference to the task in the unit processor P1.

Incidentally, in the embodiment, processing that waits until the interrupt handling, which is executing on the other unit processor, is completed, may be executed immediately before interrupt inhibit, so as not to activate processing to which the loc_cpu is subjected while the interrupt handler is being executed. Such processing is shown in the flowchart in FIG. 6.

Figure 6:
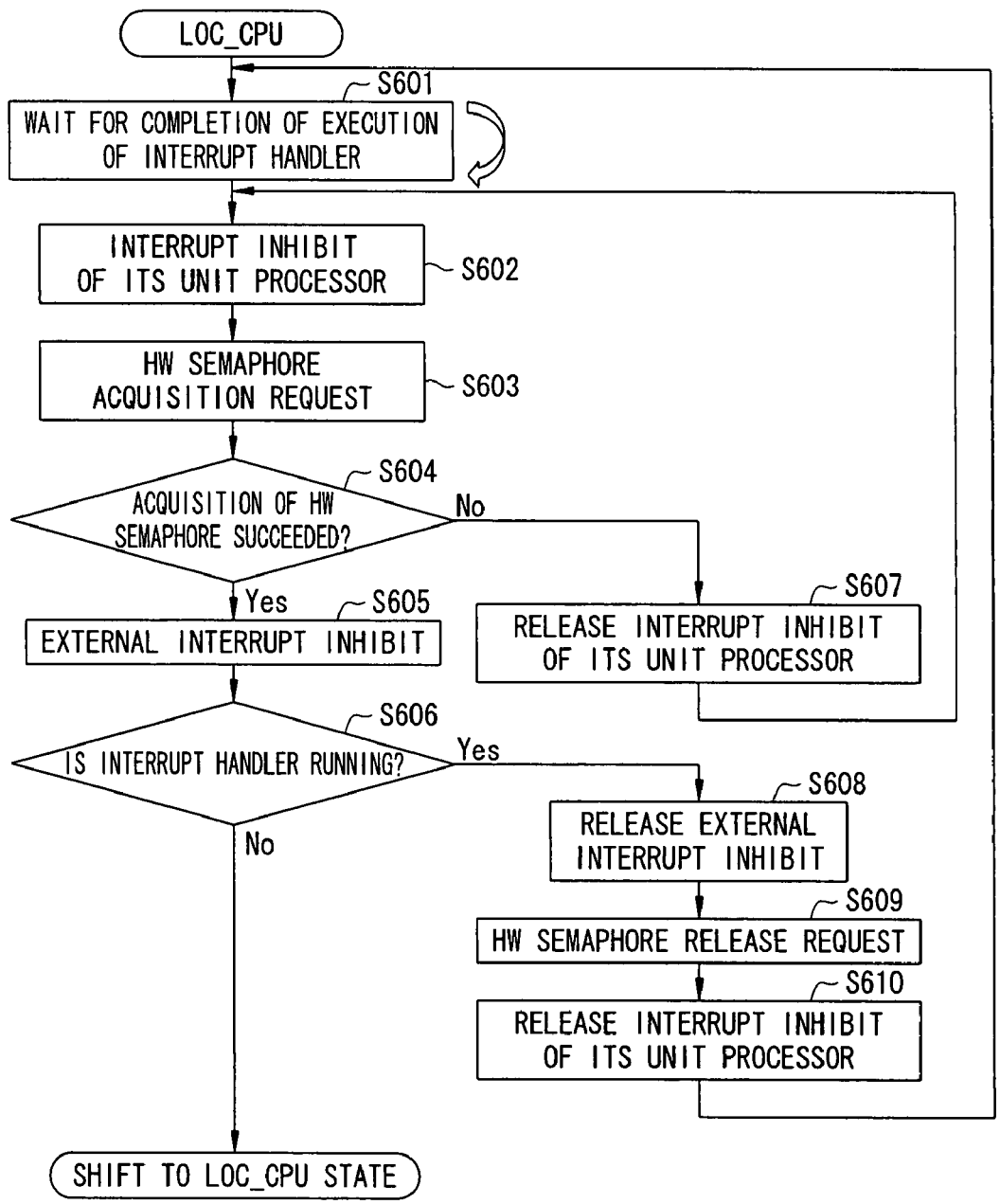
FIG. 6 is a flowchart illustrating a variation of processing presented by the flowchart shown in FIG. 5.

In the processing shown in the flowchart in FIG. 6, the task on the unit processor P0 waits for the completion of the execution of the interrupt handler on the other unit processor at the beginning of the processing (S601). Then, if the interrupt handler is being executed on any of the unit processors (S606: Yes), the external interruption is permitted (S608), and the hardware semaphore is released (S609). Then, the purge inhibit flag 106 is set to zero, and the completion of the execution of the interrupt handler is determined again (S601).

After the completion of the interrupt handler, the purge inhibit flag 106 is set to 1. By setting the purge inhibit flag 106 to 1, the task itself is not purged from the unit processor P0.

Next, the task acquires a hardware semaphore. If the task cannot acquire the hardware semaphore immediately (S604: No), the task sets the purge inhibit flag 106 to zero (S607), and begins with the processing for setting the purge inhibit flag 106 to 1 again (S602). On the other hand, if the task could acquire the hardware semaphore (S604: Yes), the task inhibits external interruption in regard to the other unit processors (S605).

According to the processing described above, since, if a request for interruption is made during a wait for the completion of the interruption handler, the interruption is executed before the loc_cpu, the probability increases that it is determined that interrupt handling is not being executed in step S405 in FIG. 5. Thus, the processing shown in FIG. 6 can achieve higher responsiveness to interrupt handlers than that of the processing shown in FIG. 5.

The processor of the embodiment also performs exclusive control between service calls among a plurality of unit processors. The exclusive control between respective service calls will be described below.

Figure 7:
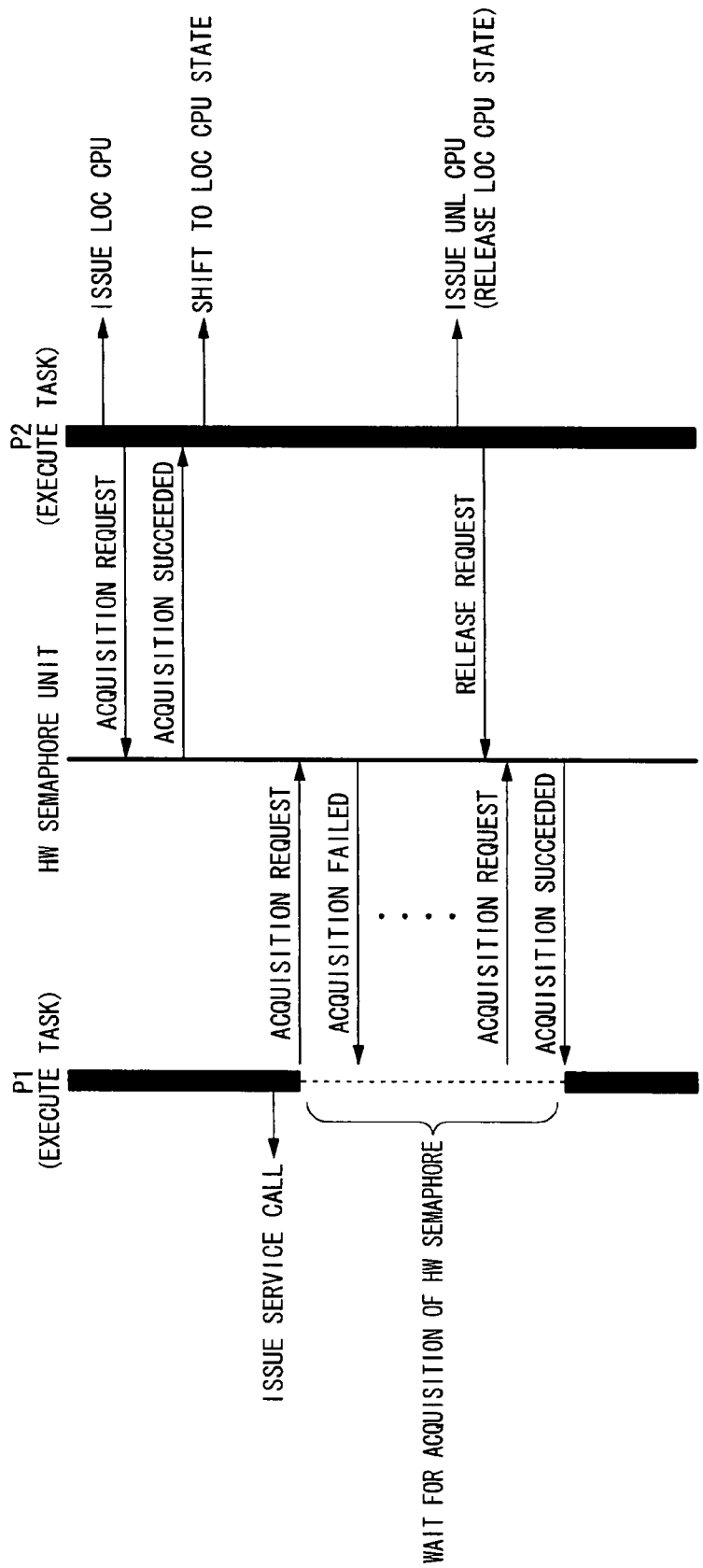
FIG. 7 is a diagram illustrating the operation of the exclusive control between a service call and loc_cpu according to the embodiment of the present invention.
Figure 8:
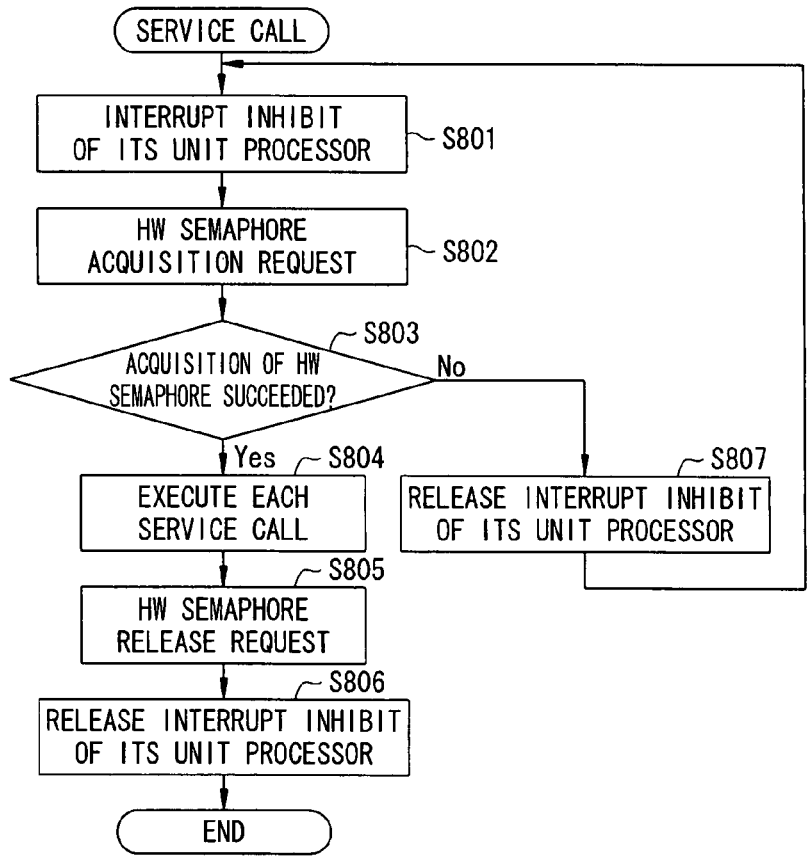
FIG. 8 is a flowchart of the operation shown in FIG. 7.

FIG. 7 is a diagram illustrating the operation of exclusive control performed between each service call and the loc_cpu. In addition, FIG. 8 is a flowchart illustrating the operation shown in FIG. 7. As shown in FIGS. 7 and 8, for example, if the task on the unit processor P1 sets the purge inhibit flag 106 to 1 (S801) and allocates itself to the unit processor P0, the task successively requests to acquire a hardware semaphore (S802). Then, the task determines whether the acquisition of the hardware semaphore succeeded or failed (S803).

In step S803, if it is determined that the hardware semaphore cannot be acquired (S803: No), the task sets the purge inhibit flag 106 of the unit processor P1 to zero to release the interrupt inhibit (S807). Incidentally, in order to execute the service call loc_cpu of a unit processor more safely, if the unit processor is in a lock state, the service call requested by a task that is being handled by another unit processor is targeted for exclusion. The task in the other unit processor is not targeted for exclusion as long as the task does not issue a service call.

While the unit processor P1 is repeating the acquisition of hardware semaphores, the unit processor P2 issues unl_cpu. This allows the unit processor P1 to acquire a hardware semaphore (S803: Yes) and execute the necessary service call (S804). After the service call is performed, the unit processor P1 requests the release hardware semaphore (S805), and the interrupt inhibit of its unit processor is released (S806).

Figure 9:
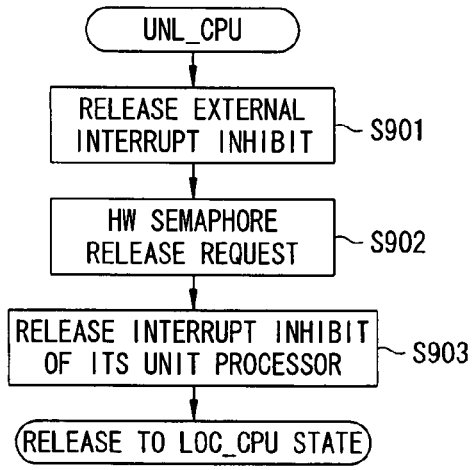
FIG. 9 is a flowchart illustrating the processing of unl_cpu according to the embodiment of the present invention.

By the issue of unl_cpu by the unit processor 2, as shown in FIG. 9, external interrupt inhibit is released (S901), the hardware semaphore is released (S902) and the interrupt inhibit of its unit processor is released (S903).

The above-described embodiment fixes a task to a unit processor to inhibit the unit processor and the other unit processors from accessing the common region in the memory. Consequently, the unit processor to which the task is fixed can certainly handle the task without being affected by another task or the like. Furthermore, since the interrupt handling by an interrupt processor is inhibited from being performed while the exclusive control is being performed, it is possible to eliminate the probability that the interrupt handling, which occurs independently of an OS, accesses the region in the memory in common with the unit processor.

In addition, it is possible to prevent exclusive control from being deadlocked due to interrupt handling being inserted after the purge flag is set to 1, and before the exclusive control starts.

Moreover, in the embodiment, the variable configuration of the interrupt processor has been described. However, the present invention is not intended to be limited to such configuration, and may be applied to the invariable configuration of the interrupt processor.

Incidentally, although the present invention can be applied to various form of processors called a multithread processor or a multitask processor, the present invention is especially useful in a multiprocessor (so-called tightly-coupled multitask processor) in which, for example, a plurality of processor cores are mounted on one chip, and a plurality of processor cores share at least some of the components of the processor.

Figure 10:
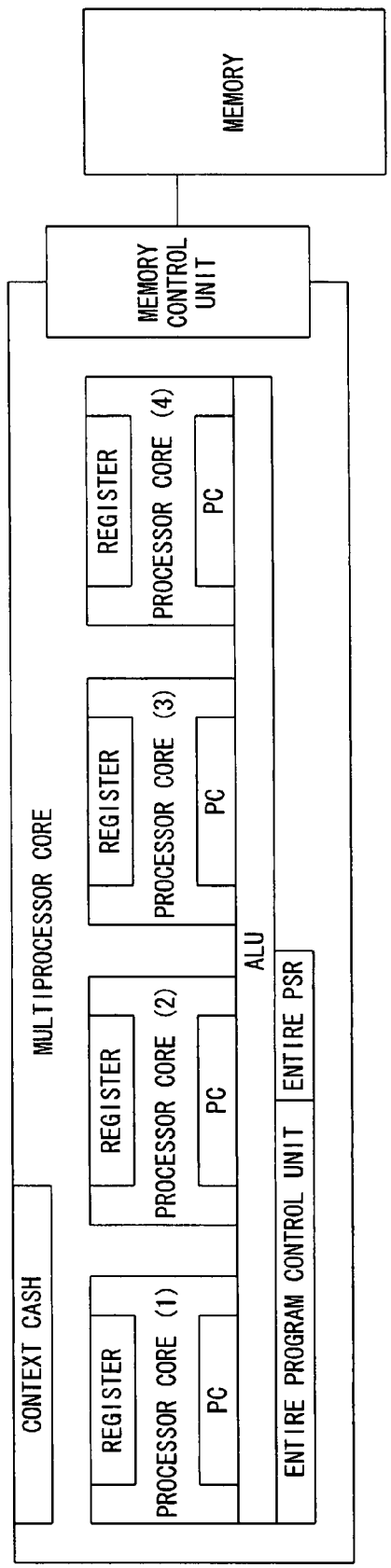
FIG. 10 is a diagram showing the configuration of a multiprocessor to which the present invention may be applied.

FIG. 10 is a diagram showing the configuration of a multiprocessor to which the present invention may be applied.

The multiprocessor shown in FIG. 10 has a form in which a plurality of processor cores share a memory control unit and an ALU, each of the processor core having a program counter and a control register such as a status register, and a program control unit for controlling the entire multiprocessor, and a control register are also separately provided. As shown in FIG. 10, a context cash or the like shared by each processor core may also be provided.

In a multiprocessor having such configuration, each processor core achieves the function of the unit processor in the embodiment, and the function of the hardware semaphore 13 is achieved in the program control unit for controlling the entire multiprocessor.

In addition, although, in the embodiment, in the light of the probability that access to the system region in the memory 30 may conflict, an example of performing the exclusive control over the shift to the OS by a plurality of unit processors has been described, the present invention may be applied to the case where there is probability that a plurality of unit processors access the same hardware, such as the exclusive control between a CPU and a Direct Memory Access (DMA) controller, and the exclusive control between applications (access to shared memory and execution of common processing).

The invention claimed is:

1. A parallel processing device that includes:

a plurality of unit processors for executing a plurality of tasks in parallel, wherein the device achieves an exclusive control between a task and another task, and between the task and an external interrupt handling when at least one of the plurality of the unit processors receives a request for an interrupt handling from an outside;

interrupt inhibit means, which is connected to each of the plurality of unit processors, for inhibiting an execution of the task from being interrupted in a unit processor on which the task is executing;

exclusive control means, which is connected to each of the plurality of unit processors, for performing the exclusive control between the plurality of unit processors by acquiring an inter-unit processor lock after the interrupt inhibit means creates a unit processor interrupt inhibit state and by inhibiting the unit processor and other unit processors from accessing a common region in a memory; and external interrupt inhibit means, which is connected to each of the plurality of unit processors, for inhibiting a performance of interrupt handling requested from the outside after the exclusive control means performs the exclusive control between the unit processor and the other unit processors.

2. The parallel processing device according to claim 1, further comprising:

interrupt detection means, which is connected to each of the plurality of unit processors, for detecting whether the interrupt handling is being performed or not in the parallel processing device, wherein the exclusive control means starts the exclusive control after the interrupt detection means detects that the interrupt handling is not being performed in the parallel processing device.

3. The parallel processing device according to claim 1, wherein the exclusive control means performs the exclusive control of the other unit processors by acquiring a right to occupy an OS to handle the plurality of tasks.

4. An exclusive control method that includes a plurality of unit processors for executing a plurality of tasks in parallel, and achieves an exclusive control between a task and another task, and between the task and an external interrupt handling when at least one of the plurality of unit processors receives a request for an interrupt handling from an outside, the method comprising:

an interrupt inhibit step for inhibiting the execution of the task from being interrupted in a unit processor on which the task is executing;

an exclusive control step for performing the exclusive control between the plurality of unit processors by acquiring an inter-unit processor lock after the interrupt inhibit step causes a unit processor interrupt inhibit state and by inhibiting the unit processor and other unit processors from accessing a common region in a memory; and an external interrupt inhibit step for inhibiting a performance of interrupt handling requested from the outside after the exclusive control step performs the exclusive control between the unit processor and the other unit processors.

5. The exclusive control method according to claim 4, further comprising a step of waiting for a completion of a performance of the interrupt handling requested from the outside.

6. The parallel processing device according to claim 2, wherein the exclusive control means performs the exclusive control of the other unit processors by acquiring a right to occupy an OS to handle the plurality of tasks.

* * * * *